(12) United States Patent
Schwerk (10) Patent No.: US 7,991,731 B2
(45) Date of Patent: *Aug. 2, 2011

(54) DATA ACCESS SERVICE QUERIES

(75) Inventor: Uwe Schwerk, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/890,276

(22) Filed: Sep. 24, 2010

(65) Prior Publication Data

US 2011/0016080 A1   Jan. 20, 2011

Related U.S. Application Data

(63) Continuation of application No. 11/087,203, filed on Mar. 22, 2005, now Pat. No. 7,814,044.

(51) Int. Cl.
*G06F 17/30* (2006.01)
(52) U.S. Cl. .......................... 707/600; 707/769; 719/311
(58) Field of Classification Search ........................ None
See application file for complete search history.

(56) References Cited

U.S. PATENT DOCUMENTS

| 5,544,320 | A | * | 8/1996 | Konrad ........................ 709/203 |
| 5,832,496 | A | * | 11/1998 | Anand et al. .................. 707/102 |
| 5,918,232 | A | * | 6/1999 | Pouschine et al. ......... 707/103 R |
| 6,434,544 | B1 | * | 8/2002 | Bakalash et al. .................. 707/2 |
| 6,701,311 | B2 | * | 3/2004 | Biebesheimer et al. .......... 707/5 |
| 6,978,461 | B2 | * | 12/2005 | Shapiro et al. ................. 719/311 |
| 7,039,871 | B2 | * | 5/2006 | Cronk ........................... 715/741 |
| 7,051,038 | B1 | * | 5/2006 | Yeh et al. ....................... 707/603 |
| 7,756,822 | B2 | * | 7/2010 | Danner et al. ................. 707/602 |
| 7,814,044 | B2 | * | 10/2010 | Schwerk ....................... 707/600 |
| 2002/0120787 | A1 | * | 8/2002 | Shapiro et al. ................ 709/311 |
| 2003/0120593 | A1 | * | 6/2003 | Bansal et al. .................... 705/39 |
| 2004/0003130 | A1 | * | 1/2004 | Becker et al. ................. 709/311 |
| 2005/0086239 | A1 | * | 4/2005 | Swann et al. ................. 707/100 |

OTHER PUBLICATIONS

Crystal Decisions, Inc., Seagate Info Technical Roadmap Series, Introduction to OLAP (A beginner's guide to OLAP & the concepts behind it), pp. 1-16 (Jun. 25, 2002).*
Chang-Sup Park, et al., Rewriting OLAP Queries Using Materialized Views and Dimension Herarchies in Data Warehouses, Ministry of Information & Communication of Korea and BKI21 Educational-Industrial Collaboration Fund (2000).*
Marco Pesarese, SAP Business Information Warehouse (BW); SAP AG Presentation, 1-73 (2003).*
Kodeboyina, Deepti et al., Experiences with OGSA-DAI: Porlet Access and Benchmark, Designing aand Building Grid Services Workshop, Oct. 8, 2003.*
Moror, Gianluca et al., Data Access Services and Automatic Generating of Cooperating Interfaces, IEEE Cooperative Information System, 1998 Proceedings 3rd IFCIS International Conference, pp. 177-186, 1998.*

(Continued)

*Primary Examiner* — Christyann R Pulliam
(74) *Attorney, Agent, or Firm* — Mintz, Levin, Cohn, Ferris, Glovsky and Popeo, P.C.

(57) ABSTRACT

A technique is described for selectively obtaining information stored in a business warehouse. Such a technique may include selecting a data access service from a library during run-time and presenting data within the business warehouse using the selected data access service. The library may contain at least one data access service for each of a plurality of on-line analytical processing data access queries. Related apparatus, systems, computer program products, and computer systems are also described.

20 Claims, 4 Drawing Sheets

OTHER PUBLICATIONS

Curbera, Franciso, et al., Unraveling the Web Services WEb an Introduction to SOAP, WSDL, and UDDI, IEEE Internet Computing, Mar./Apr. 2002.*

Sinderson, Elias, et al., Middleware and Web Serivces for the Collaboration Information Portal of NASA's Mars Exploiration Rovers Mission, Middleware 2004, LNCS 3231, pp. 1-17, 2004.*

* cited by examiner

DATA ACCESS SERVICE QUERIES

CROSS REFERENCE TO RELATED APPLICATIONS

This application is a continuation of U.S. application Ser. No. 11/087,203, filed Mar. 22, 2005 now U.S. Pat. No. 7,814,044, entitled DATA ACCESS SERVICE QUERIES, the disclosure of which is incorporated herein by reference.

TECHNICAL FIELD

This subject matter described herein relates to accessing business warehouse data, and more particularly to on-line analytical processing.

BACKGROUND

Business warehouse arrangements are becoming increasingly popular as enterprises aggregate data from disparate sources. Information stored in business warehouses may be used, for example, by tools that visualize such data for analytical purposes (e.g., pivot tables, slice and dice mechanisms, drilldown capabilities, etc.) or for presentation purposes (e.g., charts, cockpits, etc.).

Data from within a business warehouse may be obtained in response to an on-line analytical processing (OLAP) query. OLAP queries may retrieve subsets of data stored within a business warehouse. Queries may also be used to provide supporting infrastructure such as aggregation, evaluation of conditions, and calculation of additional number not directly provided by the business warehouse.

In order to facilitate responses to an OLAP query, the underlying data is stored in a multi-dimensional cube format. Each axis of the cube contains identifiers from a field column in a database table and is referred to as a dimension. For example, a first dimension may contain product names, a second dimension may contain store names, and a third dimension may contain measures relating to the various products and stores (e.g., volume, cost, revenue, etc.). In most cases, a dimension is comprised of the same class of objects.

The outputs resulting from OLAP queries are typically complex result sets that may consist of information for row headers, column headers, and all data cells. If an OLAP query result is too complex, business processes may be disrupted and processing resources may be unnecessarily consumed.

SUMMARY

In one aspect, a method for selectively obtaining information stored in a business warehouse comprises selecting a data access service from a library during run-time, wherein the library contains at least one data access service for each of a plurality of on-line analytical processing data access queries, and presenting data within the business warehouse using the selected data access service.

There are also numerous other variations that may be implemented singly or in combination with the generation (or definition) of a data access service.

In one variation, the may method may additionally comprise receiving an on-line analytical processing data access query having dimensions and measures, selecting input parameters from the dimensions of the data access query, selecting output parameters from at least one of the dimensions and measures of the data access query, generating a data access service based on the selected input and output parameters, and storing the data access service in the library.

The method may also include presenting a user with a series of interrogatories within a graphical user interface (e.g., a wizard process) to select at least one of the input and output parameters.

Various actions may be taken in order to select the input and/or output parameters. For example, the method may further comprise selecting at least one dimension of the data access service query in a row or a column format as an input parameter. Output parameters or non-mandatory input parameters may be selectively removed. Input parameter capabilities may be restricted from a multiple value input to a single value input. Input parameter values may be overwritten with default input parameter values. Other filtering/selection schemes may be implemented based on the desired configuration and output.

The method may also provide that a single measure or a single dimension of the data access service query is selected as an output parameter. Optionally or in addition, the method may further comprise filtering query data along a dimension corresponding to the selected input parameter of the data access service All dimension may be aggregated with the exception of any dimensions specified as an output of the data access service. In some variations, a description is associated for each data access service. Such descriptions may be used in order to select an appropriate data access service (by, for example, word searching).

In another aspect, a computer-implemented method for generating a data access service comprises receiving an on-line analytical processing data access query having dimensions and measures, selecting input parameters from the dimensions of the data access query, selecting output parameters from at least one of the dimensions and measures of the data access query, and generating a data access service based on the selected input and output parameters. This method may optionally also include storing a plurality of generated data access services in a library.

In yet another aspect, an apparatus to selectively obtain information stored in a business warehouse comprises a selection unit to select a data access service from a library during run-time, wherein the library contains at least one data access service for each of a plurality of on-line analytical processing queries, and a presentation unit to present data within the business warehouse using the selected data access service.

The apparatus may, in some variations, also include a receiver to receive an on-line analytical processing data access query having dimensions and measures, a selection unit to select input parameters from measures of the data access query and to select output parameters from at least one of the dimensions and measures of the data access query, and a generator to generate a data access service based on the selected input and output parameters.

In another aspect, a technique may be used to define a data access service based on existing queries. Such a technique may allow data access services to be accurately defined and a user to define the data access service via a wizard process for existing queries. If an appropriate query does not exist, then an infrastructure for building queries may be reused for building data access services. That way, for the processing of a data access service, the capabilities of the query may be reused.

The technique may include a heuristic portion during the definition of a data access service and during the processing of a data access service. During definition of a data access service, the input and output of the data access service may be defined based on the dimensions and measures in a query. For example, all dimensions of a query that are in rows and columns may be selected as a possible input of the data access service. One of the measures of the query may be defined as a possible output of the data access service. Moreover, the data access service may be defined such that only one dimension or one measure can be output.

The technique may further include using OLAP capabilities of queries during the processing of the data access services in order to reduce the complexity of a result set output from the data access service. This complexity reduction may be accomplished, for example, by applying all input as filtering for an appropriate dimension. The complexity reduction may, additionally, or in the alternative, aggregate all dimensions with the exception of a dimension that has been specified as an output. Optionally, a list of dimension members may be returned if the output is a dimension or all dimensions may be aggregated and a single number for that measure may be returned if the output is a measure.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein may provide one or more of the following advantages. For example, the subject matter described herein allows business warehouse data to be made available as a semantically rich service (e.g., a data access service). Design tools for creating such services are also provided and data access services may be executed at runtime. In addition, the data access services described herein may expose all types of data available in a business warehouse. Such data may include master and fact data as well as a URL parameter container to create parameterized links to business warehouse queries/templates.

The subject matter described herein enables data access services to seamlessly work together with processes at design-time and at runtime. In addition, at process design time, a process design tool may facilitate the location and incorporation of data access services.

Data returned by a data access service may be mapped into a process context to further drive the data process (i.e., branch differently depending on the importance of a customer, etc.). Therefore, the result of a data access service may be used to provide context specific access to business intelligence data for a user working on a task generated by the process.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
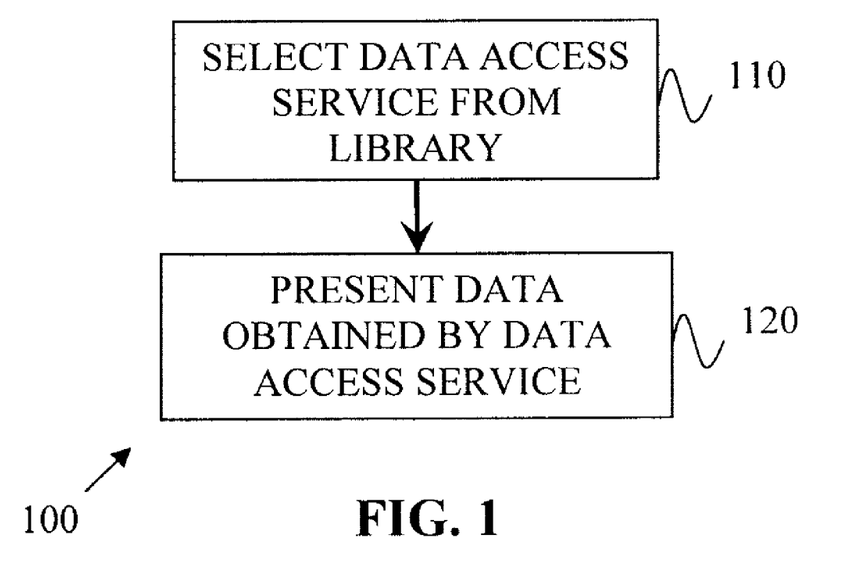
FIG. 1 is a process flow diagram illustrating a method for providing access to data within a business warehouse.

FIG. 1 illustrates a method 100 for selectively obtaining information stored in a business warehouse. As step 110, a data access service is selected from a library during run-time. After the data access service selection, at step 120, data within the business warehouse may be presented (or otherwise conveyed) using the selected data access service. The library may contain at least one data access service for each of a plurality of on-line analytical processing data access queries.

Figure 2:
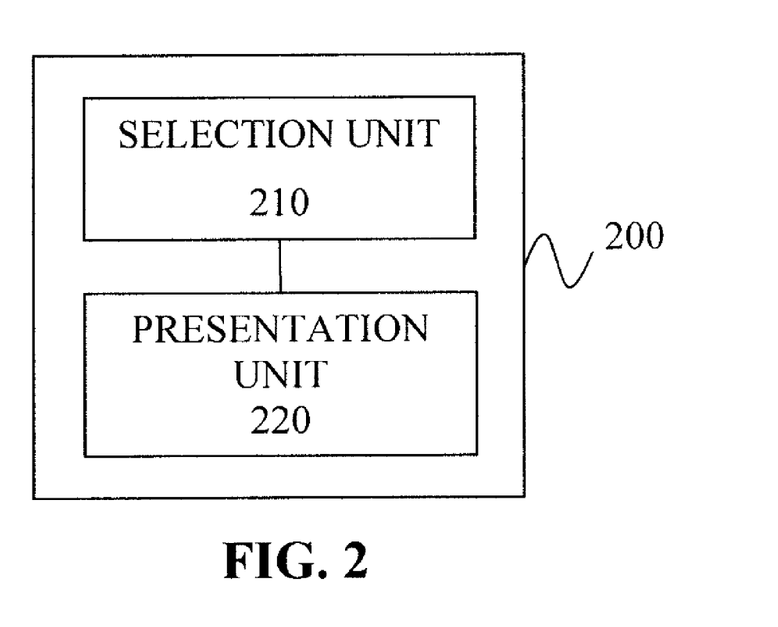
FIG. 2 is a block diagram illustrating an apparatus to provide access to data within a business warehouse.

FIG. 2 illustrates an apparatus 200 to selectively obtain information stored in a business warehouse. The apparatus 200 may include a selection unit 210 that selects a data access service from a library containing at least one data access service for each of a plurality of OLAP queries during run-time. The apparatus 200 may also include a presentation unit 210 to present data within the business warehouse using the selected data access service.

Figure 3:
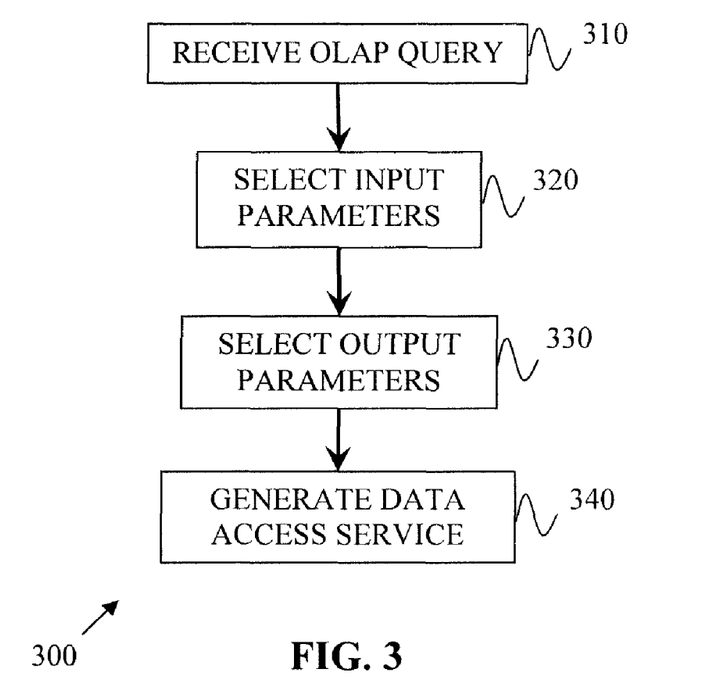
FIG. 3 is a process flow diagram illustrating a method for generating a data access service.

FIG. 3 illustrates a method 300 (inter-related to that of method 100) for generating a data access service. The method 300 may include, at step 310, receiving an on-line analytical processing data access query having dimensions and measures. At step 320, the method may continue by selecting input parameters from the dimensions of the data access query and at step 330 by selecting output parameters from at least one of the dimensions and measures of the data access query. The method 300 continues, at step 340, by generating a data access service based on the selected input and output parameters. In some variations, the method may also include storing the data access service in a library or other repository.

Figure 4:
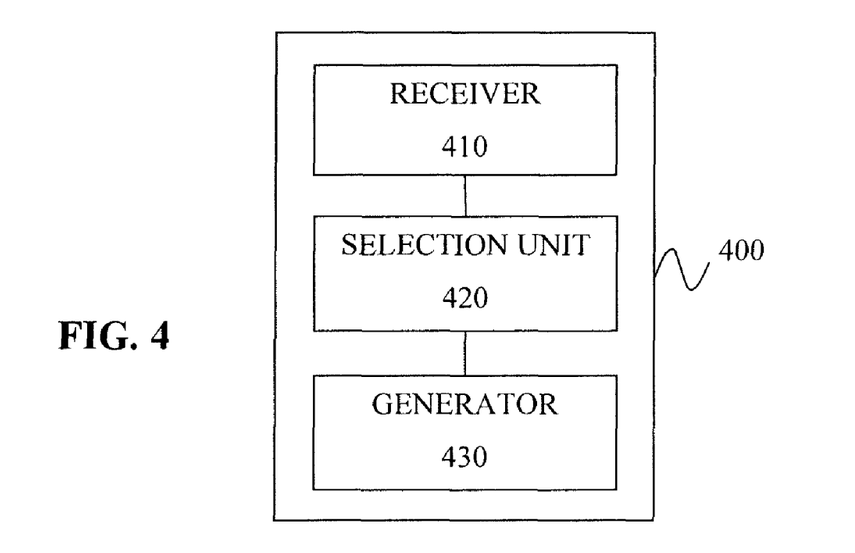
FIG. 4 is a block diagram illustrating an apparatus to generate a data access service.

FIG. 4 illustrates an apparatus 400 for generating a data access service that may include a receiver 410 to receive an on-line analytical processing data access query having dimensions and measures. The apparatus 400 may further include a selection unit 420 to select input parameters from measures of the data access query and to select output parameters from at least one of the dimensions and measures of the data access query. In addition, a generator 430 to generate a data access service based on the selected desired input and output parameters may optionally also form part of the apparatus 400.

The following provides optional variations for understanding and implementing the subject matter described herein. These variations may be combined where appropriate or may be added singly to the methods and apparatus described herein.

Figure 5:
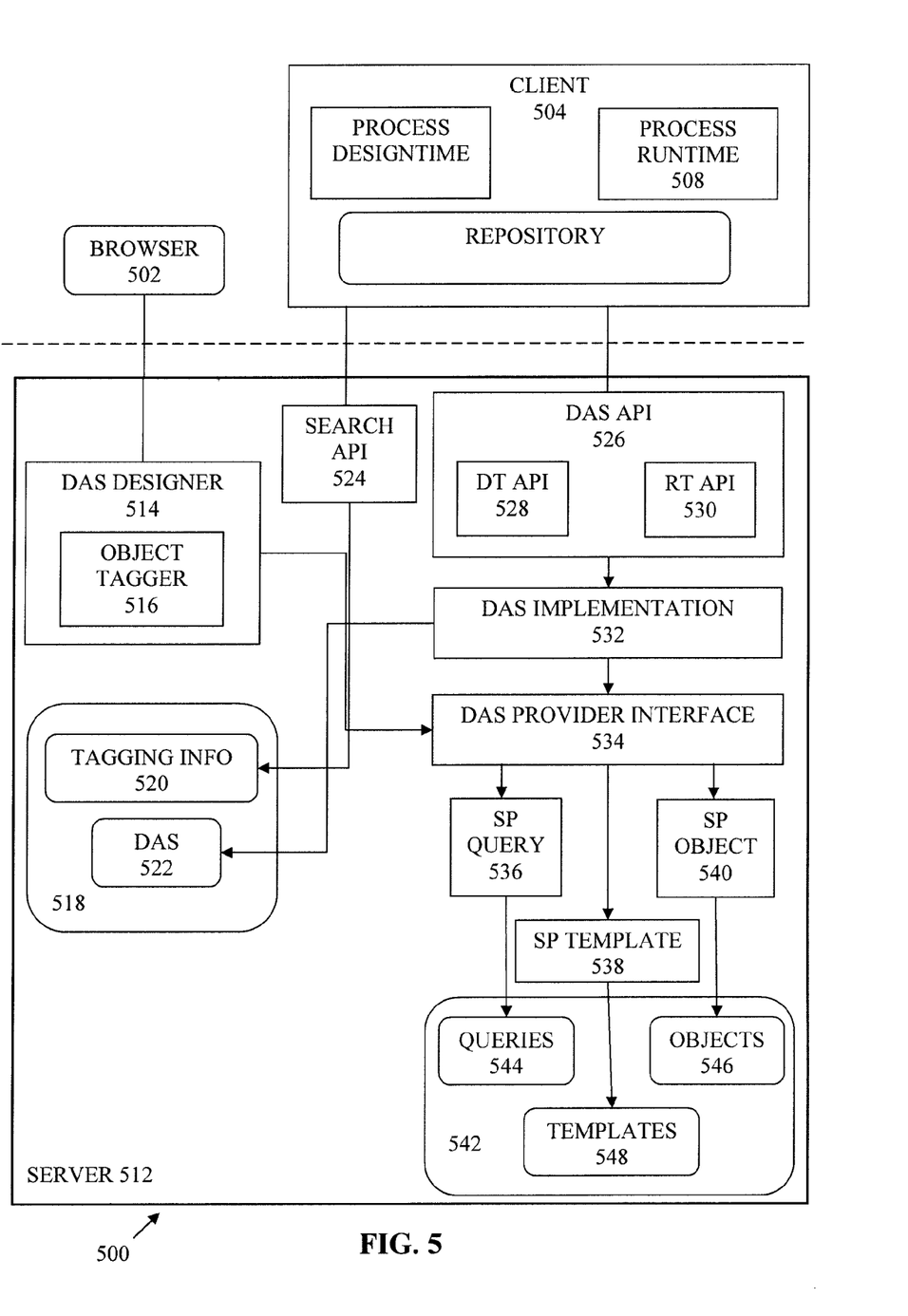
FIG. 5 illustrates a sample system architecture useful for understanding and implementing the subject matter described herein.

FIG. 5 illustrates a system architecture 500 including various connected components that may be useful for understanding and implementing the subject matter described herein. A browser 502 provides a user with access to a server 512. A client 504 may be a module that uses a data access service to obtain data from a business warehouse.

A Data Access Service Designer 514 (e.g., a business warehouse tool which may be web-based) may be used to build a Data Access Service 522. The Data Access Service Designer 514 may read specific information of an underlying business warehouse object via a Data Access Service Provider Interface 534. The Data Access Service Designer 514 may include an object tagger 516 to attach semantic information to a service and its input and output parameters (from, for example, a tagging information unit 320). Optionally, the object tagger 516 may be external to the Data Access Service Designer 514. The tagging information 520 may be persisted on a database in a business warehouse. External tools may be used to find an appropriate data access service via a Search API 524

The Data Access Service Designer 514 provides a user interface for creating and changing a Data Access Service 522. The Data Access Designer 514 may allow the selection of a specific business warehouse object which may act as a DAS Provider 542. The Data Access Service Designer 514 exposes a DAS Provider Interface 534 as data access service which may allow: removal of output and/or non-mandatory input parameters, setting of optional parameters to mandatory parameters, further restriction of input parameter capabilities (e.g., from multiple values to a single value), provision/overwriting of default values for input parameters, and removal of mandatory variables. The Data Access Designer 514 may also allow semantic enrichment of parameters of the data access service.

The Data Access Service 522 may be a business warehouse object type that represents a service to obtain data from a business warehouse. One purpose of the Data Access Service 522 may be to provide access to business warehouse data by means of pre-existing business warehouse object types (e.g., query, infoobject with master data, etc.). The Data Access Service 522 may be persisted on a business warehouse server in database tables.

A Data Access Service application programming interface (API) 526 may be used by the client 504 to initiate the Data Access Service 522. The API may include a process design time API 528 (that may be called by process modeling tools) and a process runtime part 508 (that may be called by process engines). The design time API may be used to obtain the details of the input and output parameters of a specific Data Access Service 522 and the run time API 530 may be used for actual requests for data.

A Data Access Service Provider 542 that handles queries 544, templates 548, and objects 546 may be accessed via a Data Access Service Provider Interface 534 (which in turn includes a Service Provider Query module 536, a Service Provider Template module 538, and a Service Provider Object module 540). The Data Access Service Provider 542 wraps an existing business warehouse object type (query, infoobject with master data, etc.) to expose its data as a data access service (i.e., the DAS Provider 542 implements the Data Access Service Provider Interface 534).

At design-time, the client 504 finds the appropriate Data Access Service 522 via the Search API 524. After that, access to the specified Data Access Service 522 may be accomplished via the Data Access Services API 526 (which is a set of interfaces implemented by the Data Access Service Implementation 532).

Figure 6:
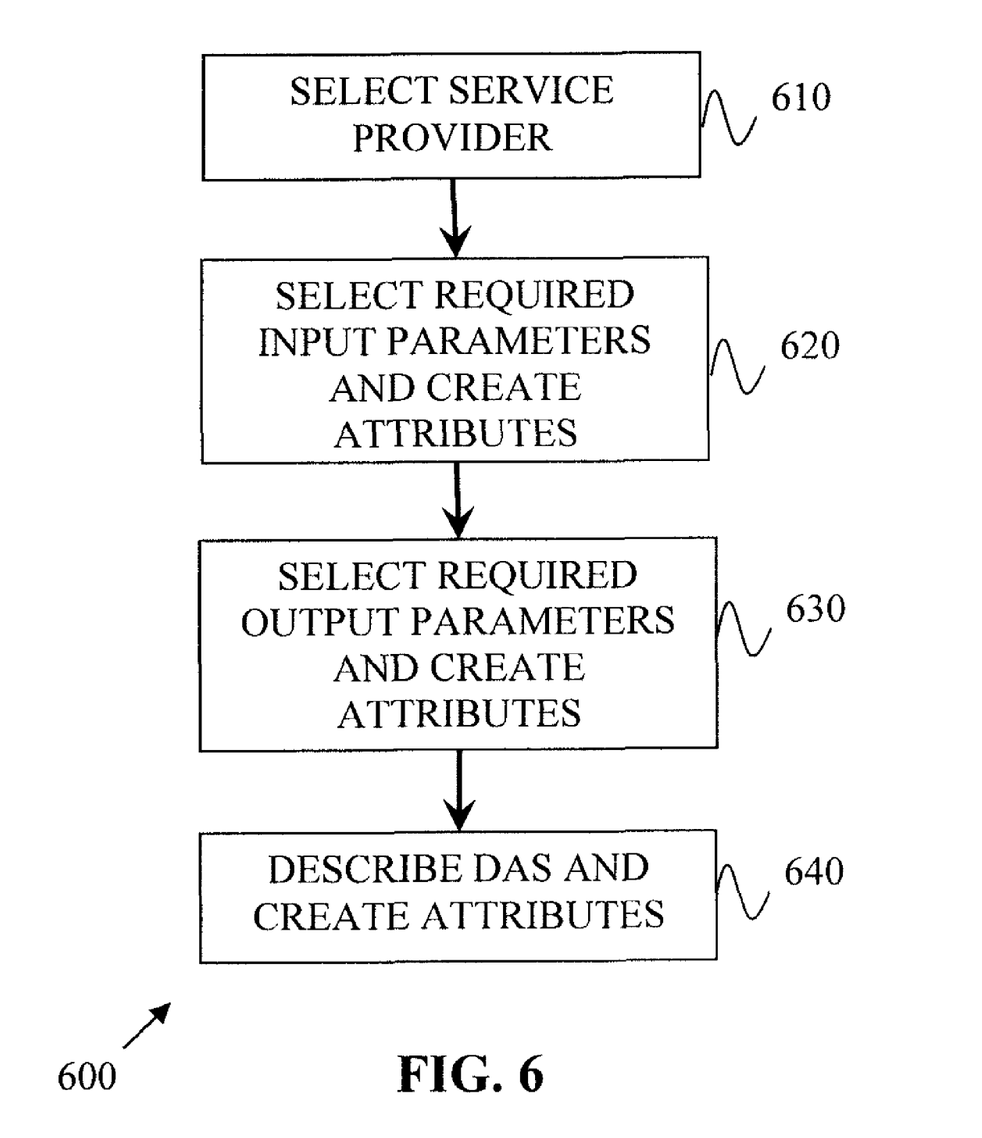
FIG. 6 is a process flow diagram illustrating a wizard process for use in defining a data access service.

In some variations, a wizard process 600 as illustrated in FIG. 6 may be utilized by a Data Access Service Designer 514 to lead a user through the steps that may be used to create a data access service. A wizard process presents a user with a graphical user interface and a series of sequential interrogatories which guide the user through the process of designing a data access service. At step 610, the wizard may prompt the user to select a desired service provider (e.g., query, template, master data, etc.). At step 620, the wizard may prompt the user to select required input parameters and to create attributes for the parameters. At step 630, the wizard may prompt the user to select output parameters and to create attributes for the parameters. At step 640, the wizard may prompt the user to describe the data access service and to create attributes for the service.

The description of input parameters may include, for example, data type (if the DAS provider is a query, the data type for input parameters may be based on the associated characteristic), a flag indicating if that input parameter is mandatory for that service, additional flags that indicate if the input parameter supports (a) multiple values (b) intervals, and/or (c) multiple intervals. The description of the output parameters may include, for example, data type of the output parameter, a flag that indicates if the output parameter contains multiple values, additional flags that indicate if the output parameter may carry (a) a currency, (b) a unit, and the like.

A typical data access service based on an OLAP query may, for example, have input parameters based on characteristics in the query (e.g., department, fiscal year, etc.), and output parameters based on key figures in the query (e.g., budget). When such a data access service is called (e.g. with a specific fiscal year as input parameter value) it would, by means of the heuristics described above, return as value for the output parameter budget, the budget (aggregated over all departments) for that fiscal year. Alternatively, a call of the same data access service with a specific fiscal year and a specific department as input parameter values would return as value of the output parameter budget, the budget of the specified department in the specified fiscal year.

The attributes attached to (or otherwise associated with) input and output parameters of a data access service provide information to identify the parameters and their respective functionality. For example, the attributes (e.g., service and parameter descriptions) may be searchable in order to facilitate the selection of a proper data access service. In some variations, a central repository may aggregate attributes for various data access services across multiple services (for example, a business warehouse as well as a Customer Relationship Management system into a Universal Description, Discovery and Integration repository). Such attributes may also be used to generate a library of data access services.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method for selectively presenting information stored in a business warehouse, the method comprising:
    transmitting, by a server to a client, a list of available data access services, the list of data access services being part of a library containing at least one data access service for each of a plurality of on-line analytical processing data access queries, the data access service being a service offered by the server to the client to provide access to an on-line analytical processing query performed at the server system through a service call to the data access service, the data access service having a predefined selection of input parameters to define a selection of data from the query and a predefined selection of a single output parameter to define output data to be provided as a result of the selection of the data from the query based on the input parameters, at least one of the data access services being built using a data access service designer, the data access service designer including an object tagger to attach semantic information to a service and its input and output parameters;
    receiving, by the server from the client, data characterizing an invocation of a selected data access service from the list; and
    transmitting, by the server to the client, data within the business warehouse using the selected data access service via a data access service provider wrapping an existing business warehouse object type to expose its data as the data access service.

2. A method as in claim 1 further comprising:
    receiving, by the server, data characterizing (i) an on-line analytical processing data access query having dimensions and measures, (ii) selected input parameters from the dimensions of the data access query, (iii) selected output parameters from at least one of the dimensions and measures of the data access query; and
    generating, by the server, another data access service based on the selected input and output parameters; and
    storing, by the server, the other data access service in the library.

3. A method as in claim 2, further comprising: transmitting data, by the server, to enable a user to be presented with a series of interrogatories within a graphical user interface to select at least one of the input and output parameters.

4. A method as in claim 2, further comprising: receiving, by the server, data characterizing selection of at least one dimension of the data access service query in a row or a column format as an input parameter.

5. A method as in claim 2, further comprising: receiving, by the server, data characterizing selectively removed output parameters or non-mandatory input parameters.

6. A method as in claim 2, further comprising: restricting, by the server, input parameter capabilities from a multiple value input to a single value input.

7. A method as in claim 2, further comprising: overwriting, by the server, input parameter values with default input parameter values.

8. A method as in claim 2, wherein a single measure of the data access service query is selected as an output parameter.

9. A method as in claim 2, wherein a single dimension of the data access service query is selected as an output parameter.

10. A method as in claim 2, further comprising: filtering, by the server, query data along a dimension corresponding to the selected input parameter of the data access service.

11. A method as in claim 2, further comprising: aggregating, by the server, all dimensions except for any dimension to be specified as an output of the data access service.

12. A method as in claim 2, further comprising: associating by the server, a description for each data access service.

13. A method as in claim 12, wherein the selecting a data access service from a library comprises conducting a word search of the descriptions associated with each data access service.

14. A method as in claim 1, wherein the data access service designer allows semantic enrichment of parameters of the data access service.

15. A method as in claim 1, wherein the data access service is a business warehouse object type that represents a service to obtain data from a business warehouse, the data access service providing access to business warehouse data by means of pre-existing business warehouse object types, wherein the data access service is persisted on a business warehouse service in database tables.

16. A computer-implemented method comprising:
    receiving, by a server, data characterizing (i) an on-line analytical processing data access query having dimensions and measures, (ii) selected input parameters from the dimensions of the data access query, (iii) a single output parameter from at least one of the dimensions and measures of the data access query;
    generating, by the server, a data access service based on the selected input and output parameters, the data access service being a service offered by the server to a client to provide access to the on-line analytical processing query performed at the server through a service call to the data access service, the selected input and output parameters serving as predefined criteria of the data access service to apply to the data access query in response to the service call;

aggregating, by the server, attributes from a plurality of generated data access services across multiple services in a central repository; and generating, by the server, a library of data access services based on the aggregated attributes, the library being accessible by a client at a server such that the client can select and invoke the data access services within the library;

wherein at least one of the services is built using a data access service that includes an object tagger to attach semantic information to a service and its input and output parameters.

17. A method as in claim 16, further comprising:

receiving, by the server, data indicating that a data access service from the library has been invoked by the client; and transmitting, by the server to the client, data within the business warehouse using the selected data access service.

18. A system comprising:

a server comprising at least one first computing system; and a client coupled to the server comprising at least one second computing system;

wherein the client requests a list of available data access services from the server, the list of data access services being part of a library containing at least one data access service for each of a plurality of on-line analytical processing data access queries, the data access service being a service offered by the server to the client to provide access to an on-line analytical processing query performed at the server system through a service call to the data access service, the data access service having a predefined selection of input parameters to define a selection of data from the query and a predefined selection of a single output parameter to define output data to be provided as a result of the selection of the data from the query based on the input parameters, at least one of the data access services being built using a data access service designer, the data access service designer including an object tagger to attach semantic information to a service and its input and output parameters;

wherein the client invokes a selected data access service from the list; and wherein data within the business warehouse is presented at the client using the selected data access service via a data access service provider wrapping an existing business warehouse object type to expose its data as the data access service.

19. A system as in claim 18, wherein the data access service is a business warehouse object type that represents a service to obtain data from a business warehouse, the data access service providing access to business warehouse data by means of pre-existing business warehouse object types, wherein the data access service is persisted on a business warehouse service in database tables.

20. A system as in claim 18, wherein the server:

transmits data to the client to enable a user to be presented with a series of interrogatories within a graphical user interface to select at least one of the input and output parameters.

* * * * *